(12) United States Patent
Rahamim (10) Patent No.: US 6,782,082 B2
(45) Date of Patent: Aug. 24, 2004

(54) METHOD AND SYSTEM FOR REDUCING CROSS-TALK AND AVOIDING BRIDGED TAPS

(75) Inventor: Raphael Rahamim, Orange, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/206,069

(22) Filed: Jul. 29, 2002

(65) Prior Publication Data

US 2003/0156691 A1 Aug. 21, 2003

Related U.S. Application Data

(60) Provisional application No. 60/356,745, filed on Feb. 15, 2002.

(51) Int. Cl.[7] ............................................... H04M 11/02
(52) U.S. Cl. ............................... 379/93.28; 379/93.33; 379/93.32
(58) Field of Search ...................... 379/93.28, 93.32, 379/93.33, 90.01, 93.01, 93.05, 93.08, 93.09; 375/222, 225

(56) References Cited

U.S. PATENT DOCUMENTS

| | | | | | |
|---|---|---|---|---|---|
| 5,297,186 A | * | 3/1994 | Dong | ........................... | 375/222 |
| 6,266,348 B1 | * | 7/2001 | Gross et al. | ................. | 370/493 |
| 6,327,311 B1 | * | 12/2001 | Ojard | ........................... | 375/219 |
| 6,553,075 B1 | * | 4/2003 | McGhee et al. | ............. | 375/222 |
| 6,625,262 B2 | * | 9/2003 | Starr | ........................ | 379/93.08 |

FOREIGN PATENT DOCUMENTS

| | | | |
|---|---|---|---|
| DE | 198 50 050 C 1 | 3/2000 | ........... H04L/27/00 |
| EP | 0 987 852 A2 A3 | 3/2000 | ............. H04L/5/14 |
| EP | 1 065 818 A1 | 1/2001 | ........... H04J/11/00 |
| WO | WO 01/35610 A1 | 5/2001 | ............ H04M/1/24 |
| WO | WO 01/52439 A1 | 7/2001 | ............ H04B/3/46 |

OTHER PUBLICATIONS

Copy of European Search Report for Appln. EP 03 00 3603, issued Nov. 3, 2003, 4 pages.

* cited by examiner

*Primary Examiner*—Melur Ramakrishnaiah
(74) *Attorney, Agent, or Firm*—Sterne, Kessler, Goldstein & Fox PLLC (57) ABSTRACT

The present invention establishes a communications link between a central office (CO) modem and a customer premise equipment (CPE) modem. The CO modem then evaluates the performance of the communications link. Impairments on the communications link are identified based on the evaluation results. Next, adjustment parameters for improving the performance of the communications link are determined. The CPE modem is then modified in accordance with the determined adjustment parameters to establish an adjusted communications link between the CO modem and the CPE modem. In this way, impairments such as bridged taps and cross-talk can be avoided.

8 Claims, 6 Drawing Sheets

METHOD AND SYSTEM FOR REDUCING CROSS-TALK AND AVOIDING BRIDGED TAPS

CROSS-REFERENCE TO RELATED APPLICATIONS

This application claims priority to U.S. Provisional Application No. 60/356,745, filed Feb. 15, 2002, which is incorporated by reference herein in its entirety.

BACKGROUND OF THE INVENTION

1. Field of the Invention

This invention relates to the field of high speed communications.

2. Background

The present invention is directed to a high speed communications device, such as, for example, but not limited to, an xDSL modem, a cable modem, a voiceband modem, a satellite communication system, a point-to-point wired or a wireless communication system or other high speed communications device.

Most homes and businesses are connected to the telephone network using twisted pair wires. These installations were originally established for providing voice band telephone services. Customers wanting to use these wires for data, used voice band modems which, until recently, could provide data rates up to 56 K bits per second. However, with the advancement of technology, particularly Digital Subscriber Line (DSL) technology, the transfer of data over the higher frequencies in the twisted pair copper wires is becoming more prevalent. The greatest advantage of DSL is that it enables data to be exchanged over the twisted pair copper wires at much higher speeds than conventional modems and analog lines.

The term xDSL refers generally to DSL technology, however, several variations of DSL technology exists. Asymmetric Digital Subscriber Line (ADSL) is the most familiar DSL technology. Other variations of xDSL technologies include, but are not limited to, High Speed Digital Subscriber Line (HDSL) and Very High speed Digital Subscriber Line (VDSL).

Typically, DSL modems transmit over the twisted pair copper wires also known as UTP (Unshielded Twisted Pair). One pair of wires carries one or more DSL channels. It is common to find installations where the DSL modems are added to an existing phone line. In this case the twisted pair ends up carrying both phone and DSL signals at the same time. DSL modems operate in pairs. One DSL modem is designated as the Central Office (CO) modem and the other is referred to as the Customer Premise Equipment (CPE) modem.

DSL technology is attractive because it provides for data exchange rates that exceed the performance of traditional analog modems. However, because copper wire telephone networks were not made with high-speed data services in mind, DSL technology is not without its problems. For example, two of the many impairments marring DSL performance are Cross-Talk and Bridged Taps. These two impairments are particularly detrimental to performance when large-scale VDSL deployment is involved.

The twisted pairs described above are bundled into a single binder or cable. Consequently, multiple twisted-pair combinations are joined together in close proximity to one another. These twisted-pair combinations carry data in the form of electrical signals being exchanged between modems operating in different frequency ranges. Cross talk occurs when the electrical signals being transmitted across one twisted pair interfere with the electrical signals being transmitted on an adjacent twisted pair. As a result of experiencing cross talk, the performance of DSL modems is impaired.

Power Back-Off (PBO) is an approach used to mitigate cross-talk. PBO is described in many documents, e.g., T1E 1.4/2000-009, T1E 1.4/2000-01 1 and T1E 1.4/2000-013 which are standards covering single-carrier and multi-carrier VDSL modems and are incorporated by reference herein in their entirety. The idea behind PBO is that the CPE modem restricts its output power. By limiting the transmitter power, cross-talk is limited. However, this does not eliminate cross-talk but rather restricts it. Unfortunately, when many modems share the same binder, cross-talk is still a limiting factor.

Overestimation, which is the inability of the CPE modem to estimate accurately the loop length between the CPE modem and the CO modem, is another major disadvantage. Overestimation occurs when there is an impedance mismatch in the line. A bridged tap, situated anywhere in one loop, might create an impedance mismatch resulting in higher power and higher cross-talk. Further, a bad or weak CPE receiver can also result in a bad estimate. Likewise, a bad or weak CO transmitter can cause the same problem. In general, overestimation results in the use of higher power which as just described affects not one, but many modems sharing the same binder.

In addition, PBO artificially lowers the transmitted power and the receiver's Signal to Noise Ratio (SNR). This reduces the receiver's immunity to noise especially to impulse noise. Even when PBO works as planned, the SNR of all the CO modems gets lower and lower as more and more connections are added. Further discussion of cross-talk is provided in detail below.

Bridged taps are a second impairment to DSL performance. Bridged taps occur when the telephone wires over which the modems are communicating do not terminate at each respective modem. For example, a telephone line is generally run along a telephone pole or buried underground and eventually provides a connection into a home via a junction box located on the outside of the home. Once inside the home, the telephone line might be run from the living room into the kitchen and finally up to a bedroom. Each of these connections represents splices made into the telephone wire for the purpose of allowing a single telephone line to be shared. In the case where the CPE modem is connected in the living room, the portion of the telephone wire extending from the living room into the kitchen is a bridged tap. Likewise, the segment running from the kitchen up to the bedroom is another bridged tap. These bridged taps might create an impedance mismatch. Impedance mismatch results in overestimation, which is the inability of the CPE modem to estimate accurately the loop length between the CPE modem and the CO modem. In general, overestimation results in the use of higher power which as described above affects the signal to noise ratio of not one, but many modems sharing the same binder.

Presently, modems are provided with an equalizer to respond to the problems created by bridged taps. The equalizer attempts to recreate the signal losses resulting from the bridged taps. However, the success of mitigating bridged taps by using an equalizer, is very limited. For one reason, the equalizer attempts to amplify the lost signals and consequently, also amplifies the noise. As a result, the equalizer can help, somewhat, but it cannot circumvent bridged taps.

The impairments to DSL technology cause it to be less effective than it otherwise could be. Therefore, a system and method are needed for reducing cross-talk and avoiding bridged taps.

BRIEF SUMMARY OF THE INVENTION

In accordance with embodiments of the present invention, a system and method are provided for improving communications performance between high speed communications devices. In an embodiment, the present invention establishes a communications link between a central office (CO) modem and a customer premise equipment (CPE) modem. The CO modem then evaluates the performance of the communications link. Impairments on the communications link are identified based on the evaluation results. Next, adjustment parameters for improving the performance of the communications link are determined. The CPE modem is then modified in accordance with the determined adjustment parameters to establish an adjusted communications link between the CO modem and the CPE modem.

In another embodiment of the present invention, a communications link is established between a central office (CO) modem and a customer premise equipment (CPE) modem. The performance of the communications link is then evaluated at a plurality of upstream carrier frequencies. The upstream carrier frequency that yields the greatest performance is selected to be the adjusted upstream carrier frequency. Finally, an adjusted communications link is established between the CO modem and the CPE modem. The adjusted communications link uses the adjusted upstream carrier frequency.

One advantage of an embodiment of the present invention is that it allows for the total elimination of Far End Cross-Talk (FEXT) whereas other attempts have only been able to lessen its effect.

Another advantage of an embodiment of the present invention is that Near End Cross-Talk (NEXT) from dissimilar modems can be avoided and mutual interference averted.

Similarly, in yet another embodiment of the present invention, bridged taps can be avoided.

Finally, in yet another embodiment, the present invention provides for the large-scale installation of VDSL modems capable of more stable and higher performance, while enjoying better immunity to noise.

Further features and advantages of the present invention, as well as the structure and operation of various system, method, and computer logic embodiments of the present invention are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE INVENTION

Exemplary System

Figure 1:
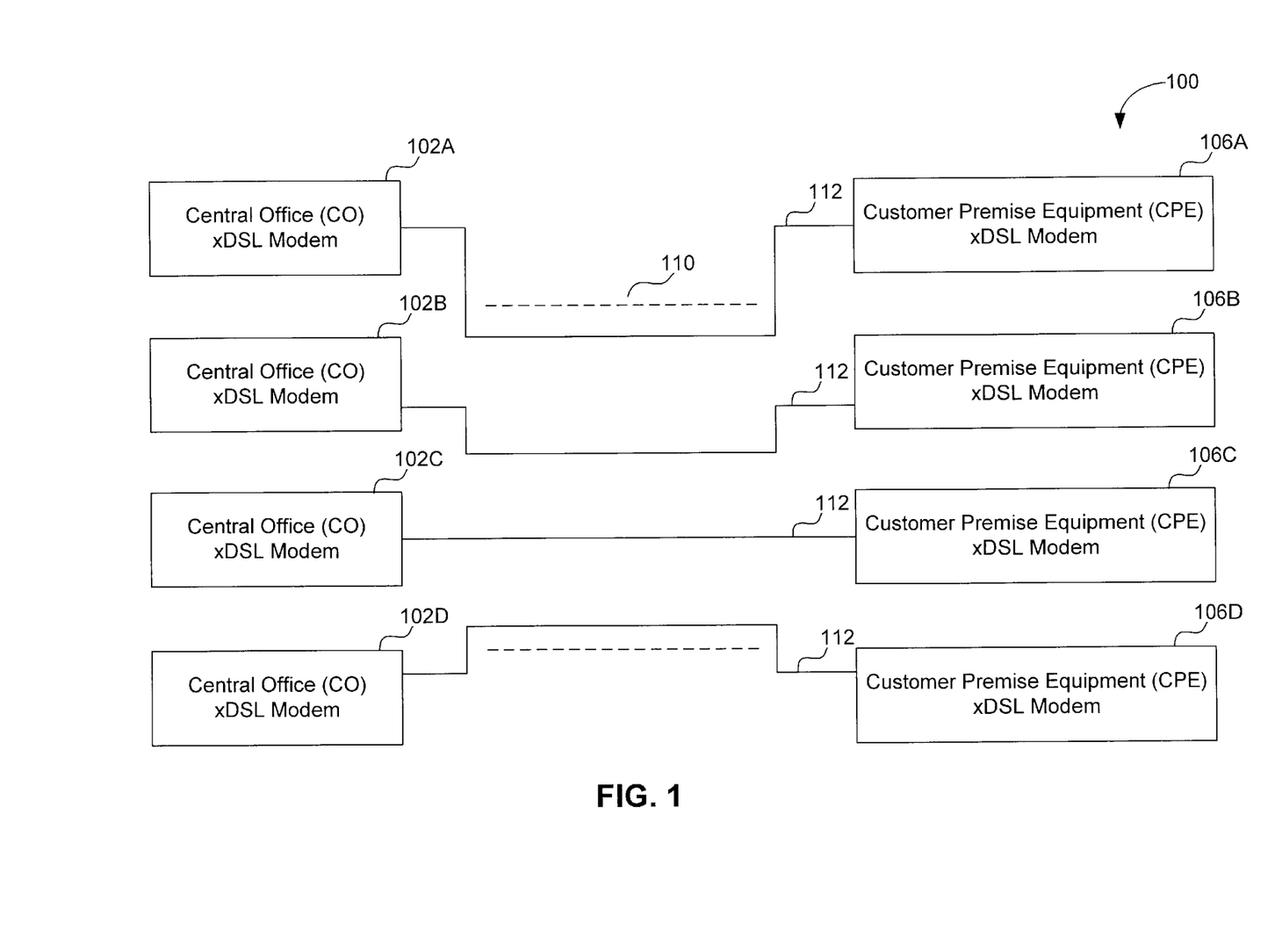
FIG. 1 is a high level block diagram of a communications system in accordance with embodiments of the present invention.

FIG. 1 is a high level block diagram of a communications system in accordance with embodiments of the present invention. The communications system 100 enables voice communications, video, and data services to be exchanged based on bidirectional transfer of Internet Protocol (IP) or Asynchronous Transfer Mode (ATM) traffic between a plurality of central office (CO) xDSL modems 102A, 102B, 102C, and 102D (referred to collectively as 102) and a plurality of customer premise equipment (CPE) xDSL modems 106A, 106B, 106C, and 106D (referred to collectively as 106) over a communications network 110.

The communications network 110 provides for the high-speed, reliable, and secure transport of data between the CO modems 102 and the CPE modems 106. As will be appreciated by persons skilled in the relevant arts(s), the functionality of the modems 102 and 106 may be combined into a single modem or device. In this way, the single modem or device can operate as either a CO modem 102 or a CPE modem. It will be further appreciated by persons skilled in the relevant arts(s), that the communications network 110 may comprise twisted-pair copper telephone lines 112, coaxial cable, fiberoptic cable, or a combination of coaxial cable and fiberoptic cable linked via one or more fiber nodes.

In the example communications system 100, four CO modems 102A–102D are shown and four CPE modems 106A–196D are shown. In general, any number of CO or CPE modems or communication networks may be included in the communications system 100 of the present invention.

Each of the CPE modems 106 operates as an interface between the communications network 110 and at least one attached user device (not shown). In particular, the CPE modems 106 perform the functions necessary to convert downstream signals received over the communications network 110 into digital data packets for receipt by the attached user device. User devices may include personal computers, data terminal equipment, telephony devices, broadband media players, network-controlled appliances, or any other device capable of transmitting or receiving data over a communication network. The CPE modems 106 also perform the functions necessary to convert data packets received from the attached user device into upstream burst signals suitable for transfer over the communications network 110. As will be appreciated by persons skilled in the relevant arts(s), IP, ATM, and other data packets may be carried over the communication system 100. Further explanation of the impairments associated with communications system 100 will now be described with reference to FIGS. 2–4.

Impairments

Transmission frequencies are determined by the length of the loop between the communicating modems, for example between a CO and a CPE modem. Higher transmission frequencies are available in cases where the loop length is short. Conversely, the useful frequency ranges in longer loops is lower. The highest voice transmission frequency presently allowed is 3.4 KHz. Analog modems adhere to the same voice transmission restrictions and therefore operate in the lowest frequency bands. DSL achieves its high rate of transmission over the twisted-pair wires by transmitting in the previously underutilized frequencies found in the higher bands. However, the transmission of signals at these higher frequencies and correspondingly higher speeds, is problematic due to cross-talk and bridged taps.

Cross-Talk

Cross-talk occurs when a significant number of DSL modems are deployed in the same location. Cross-talk occurs in two forms Far End Cross-Talk (FEXT) and Near End Cross-Talk (NEXT).

Far-End Cross Talk (FEXT)

FEXT occurs when a significant number of DSL modems are deployed in the same location. For example, referring to FIG. 2, a central office building 205 is shown with 50 CO modems (CO1–CO50). The central office building can be any place where the CO modems are centrally located. For example, a central office building could be an office building, hotel, hospital, or apartment building. The CO modems are typically housed in the same enclosure 207, such as a multiplexor, for example, and share the same UTP binder 215. Exemplary multiplexors include concentrators and digital subscriber line access multiplexors. The UTP binder 215 serves as a medium for carrying the DSL transmit and receive signals for all 50 CO modems. Accordingly, the UTP binder 215 is comprised of twisted pairs 212A, 212B, 212C, and 212D. The CO modems receive transmissions from CPE modems (CPE1–CPE50). The CPE modems will invariably be installed in 50 different locations. These locations could be for example, in separate offices, homes, or guest rooms within the central office building. Alternatively, the CPE modems could also be located externally to the central office building.

Figure 2:
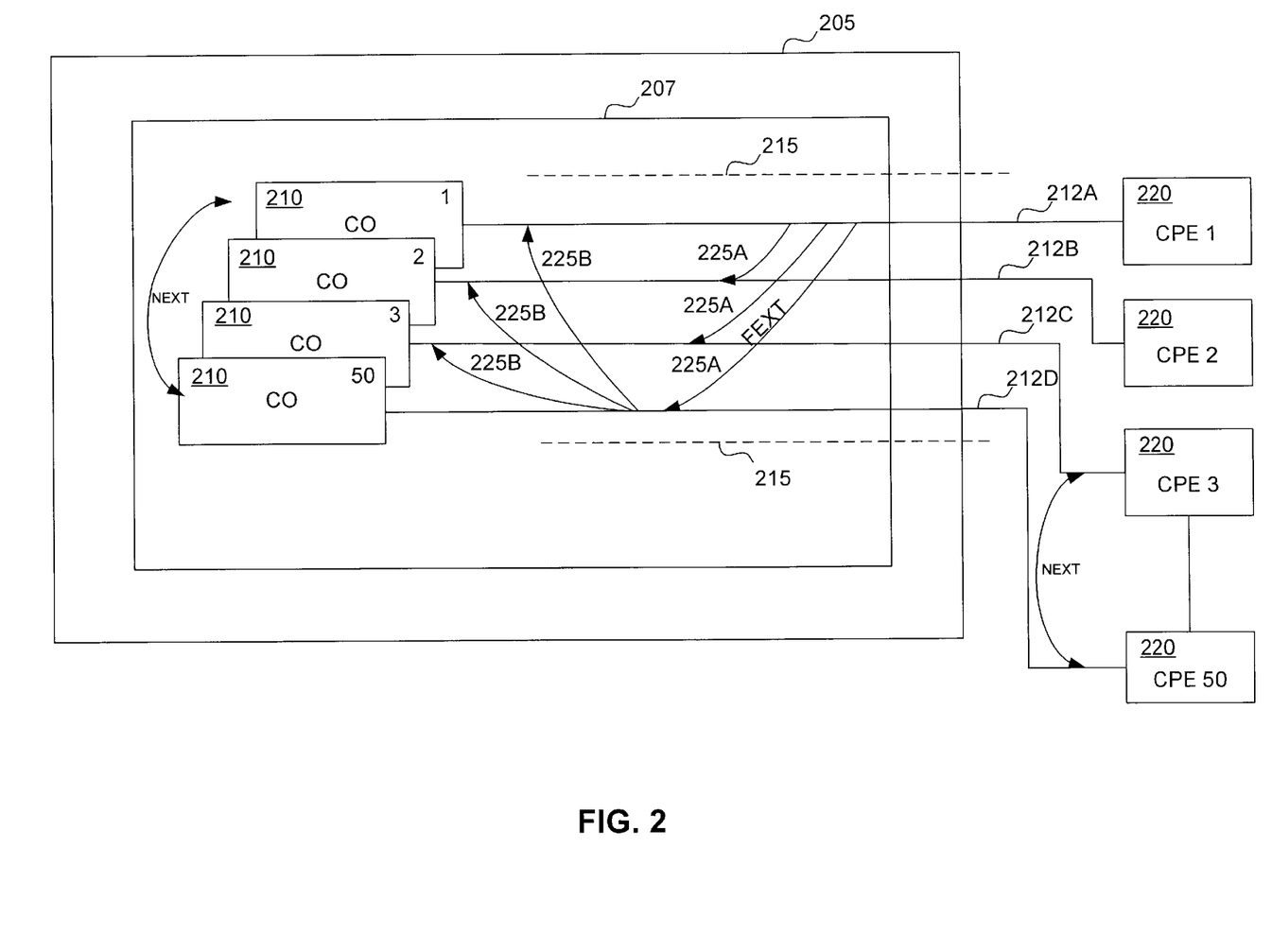
FIG. 2 is a block diagram illustration of cross-talk in a communications system.

FEXT occurs due to the inevitable coupling among all the pairs of wires 212 found in the single binder 215. With DSL, FEXT is exacerbated due to the frequencies involved; the higher the frequency, the stronger the coupling. The direction arrows 225A are used to indicate the flow of FEXT from twisted pair 212A to twisted pairs 212B, 212C, and 212D. Likewise, direction arrows 225B indicate the flow of FEXT from twisted pair 212D to twisted pairs 212A, 212B, and 212C. From this example, it should be apparent that each twisted pair has the potential for creating FEXT with each of the other respective twisted pairs.

From the above description, it should also be apparent that FEXT has a role in determining the eventual performance of all the modems sharing the same cable binder. Furthermore, the higher the FEXT, the lower the signal to noise ratio.

One reason why FEXT occurs is the frequency overlap. The interfering channel generates energies at the same frequencies to which the receiver is tuned. A second reason is that FEXT is directly related to the amount of power transmitted by the CPE. Accordingly, the more power being used to transmit, the greater the likelihood of creating FEXT. The number of twisted pairs joined in a bundle also contributes to FEXT. The higher the number of pairs in a bundle the more FEXT present on the line. The properties of the cable in use can also contribute to FEXT. For example bad, leaky and other inconsistencies in the cables will make FEXT more likely. Finally, an impedance mismatch is another contributor to cross-talk.

Near-End Cross-Talk

Like FEXT, Near-End Cross Talk (NEXT) is also present on the binder 215. NEXT occurs when one modem receives the signals being transmitted by a neighboring modem. For example, in FIG. 2, CPE3 and CPE50 are each transmitting signals to CO3 and CO50 respectively. However, because CPE3 and CPE50 are in close proximity to one another, they are producing NEXT. Similarly, the CO modems also experience NEXT. The interference created by NEXT is in the transmitter's frequency band and hence is most significant when dissimilar modems share the same bundle. The problems associated with NEXT are further exacerbated when the interfering modem has a different frequency plan such that its downstream frequencies overlap the upstream frequencies of the modem suffering from the NEXT.

Power Back Off

As previously discussed, power back off is one attempt used to reduce cross-talk. With PBO, the CPE modem attempts to estimate the loop length. It then adjusts its transmit power so that the receiving CO modem receives the same amount of power independent of the loop length. For example, referring again to FIG. 2, CPE1 is situated close to CO1 (i.e., has a short loop). Accordingly, CPE1 will transmit using very low power. However, the power level will still be enough for CO1 to have a reasonable SNR. As the loop gets longer more power will be required to transmit. Consider, for example, CPE50 and CO50. Here, the loop length is longer. Consequently, CPE50 will need to increase its transmission power to ensure its signal reaches CO50 at the proper level. This increase in transmission power will result in more cross-talk. As more modems are added, more and more cross-talk will accumulate and the receiving modem will end up with lower SNR.

Bridged Taps (BT)

Figure 3:
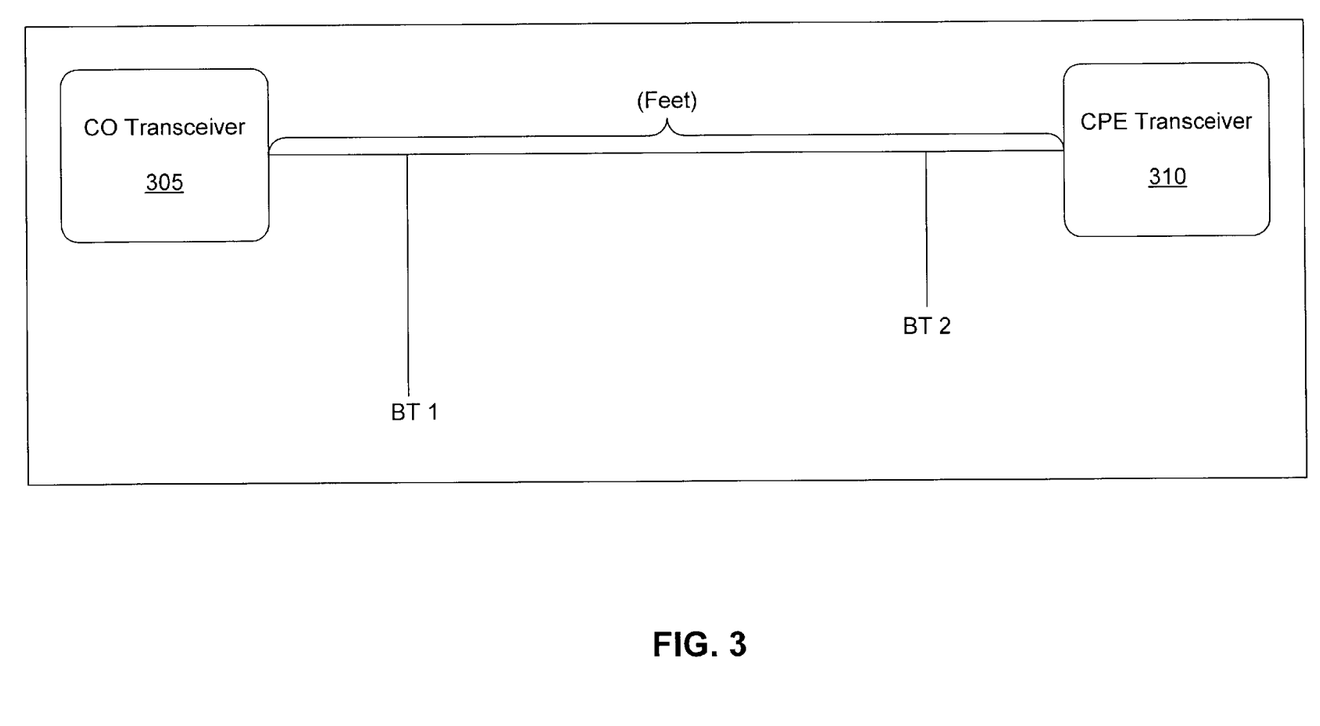
FIG. 3 is an illustration of bridged taps in a communications system.
Figure 4:
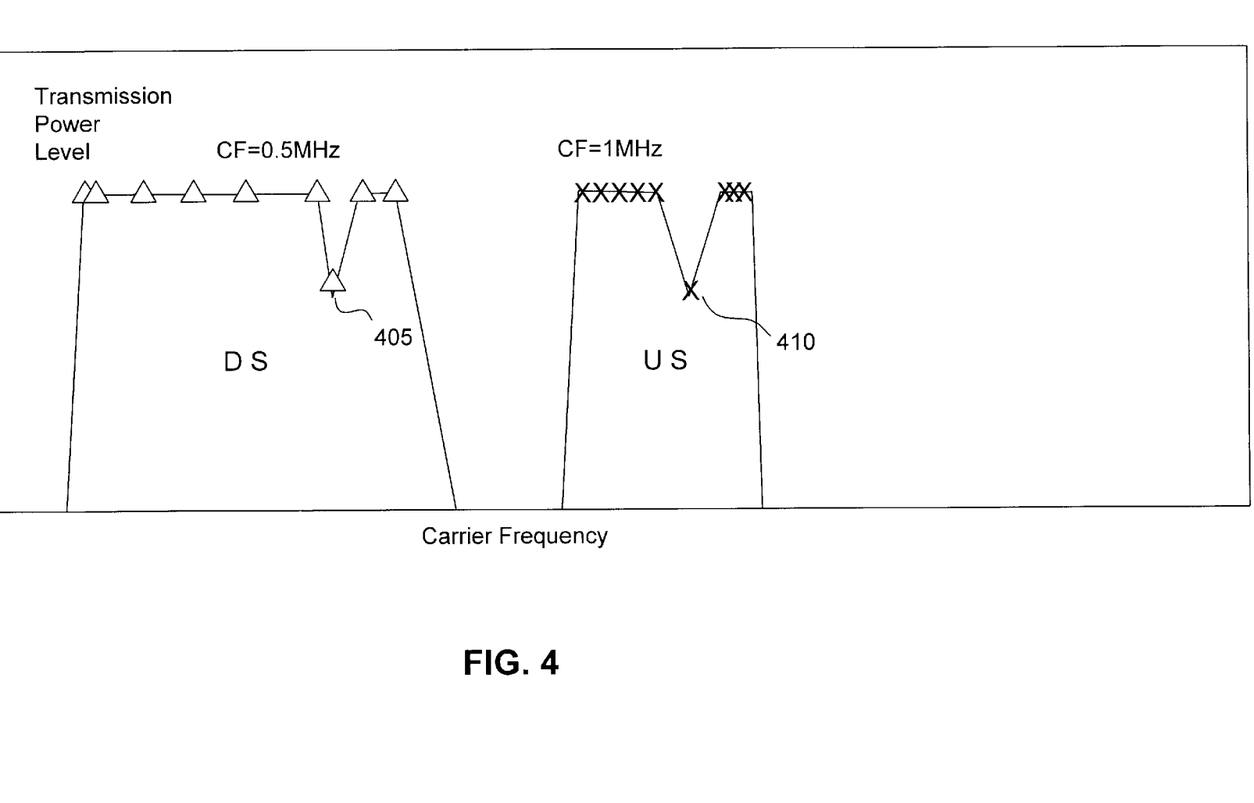
FIG. 4 is an illustration of upstream and downstream spectra with bridged taps.

Bridged Taps, like cross-talk, also impede the performance of DSL modems. FIG. 3 illustrates two bridged taps. A CO Transceiver 305 and a CPE Transceiver 310 are shown in communications with one another. Bridged taps BT1 and BT2 are also shown. BT1 is referred to as CO BT because of its proximity to the CO Transceiver 305. Likewise, BT2 is referred to as CPE BT because of its proximity to the CPE Transceiver 310. FIG. 4 illustrates what happens to the transmissions being exchanged between CO Transceiver 305 and CPE Transceiver 310 do to the presence of the CO BT and CPE BT bridged taps.

A bridged tap creates a null 405 and 410 (FIG. 4). The null is formed because the signal traveling along the cable gets reflected back into the transmitter. This results in a null (dip) inside the spectrum. The depth of the null depends primarily on the distance of the tap from the modem. The dip, created by a tap close to the modem, will be deeper than one created by a tap placed further away. In FIG. 4, a shorter tap, for example BT2 of FIG. 3, created the dip 410 in the upstream region. This is determined by the fact that the frequency of the null is higher. In comparison, a longer tap, such as BT1 of FIG. 3, is likely responsible for the dip 405 in the downstream region.

Determining which bridged tap is responsible for a particular null in the spectrum is not as simple as the above example might suggest. The frequency of the null corresponds to the length of the bridged tap. According to transmission-line theory, the length of the bridged tap equals ¼ wavelength of the null frequency. Thus, a 340 feet long bridge tap, for example, will produce a null at 0.74 MHz. To complicate matters, a bridged tap creates more than one null. It creates a null at ¼ wavelength, another one at ¾ wavelength, another at 1¼ wavelength, and so on and so forth. As a result, it is difficult to tell which tap created which null unless the first null (the one falling at the lowest frequency) is identified. Identifying the first null is complicated because the first null might fall in a frequency that is out of band and no null will be present for examination.

Referring again to FIG. 3, two scenarios are useful for describing the impaired performance created by the bridged taps. First, the signal traveling from the CPE transceiver 310 toward the CO transceiver 305 will lose energy at the frequency of the null. Second, any energy at the null frequency that is generated by the CO transceiver 305 will be reflected back to the CO transceiver 305. In either case, the signal to noise ratio is reduced. In scenario one, the received signal power is reduced because of the null. In scenario two, noise is increased because of the energy being reflected back to the CO transceiver 305. In other words, a bridged tap can lower signal to noise ratio by either bringing down the incoming power or increasing the noise floor, or both.

Reducing Cross-Talk and Avoiding Bridged Taps

As evident from the above descriptions, both cross-talk and bridged taps can be serious detriments to DSL performance. In accordance with embodiments of the present invention, pairs of modems are configured to allow the upstream band to be positioned and moved about, in any frequency above or below the downstream band. By having multiple CPE modems transmitting at dissimilar frequencies, FEXT could be all but eliminated. Similarly, bridged taps could be avoided by moving the upstream band to frequencies where bridged tap nulls do not exist. A method for reducing cross-talk and avoiding bridged taps in accordance with embodiments of the present invention will now be described with reference to FIGS. 5 and 6.

Figure 5:
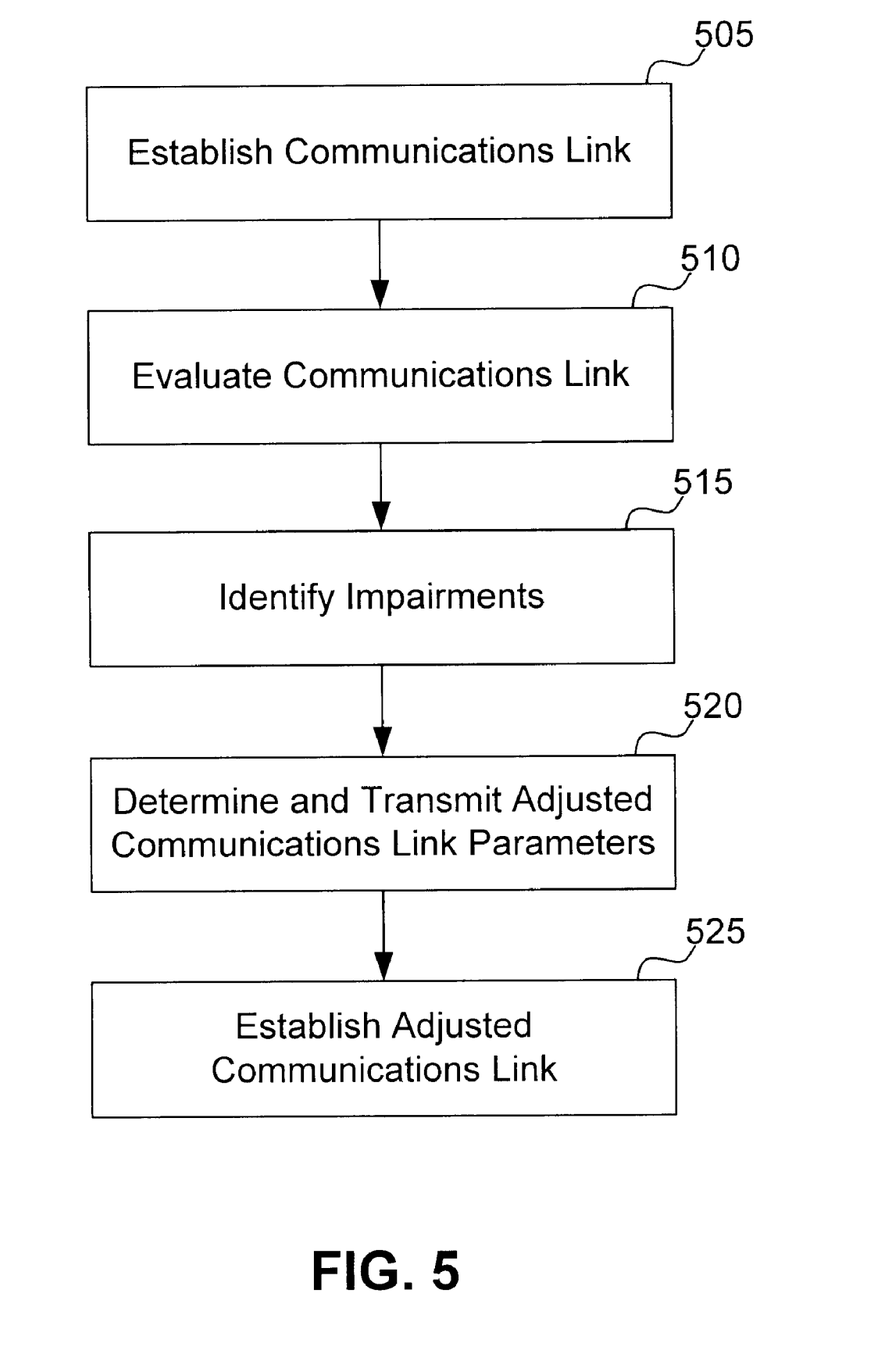
FIG. 5 is a flowchart of a method for improving communications between high speed communications devices in accordance with embodiments of the present invention.

As shown in FIG. 5, in an embodiment of the present invention, CO modem 102 transmits and creates a communications link with the CPE modem 106 during a handshaking initialization process (step 505). This first communications link is established with the upstream carrier frequency (CF) situated at a default position.

After establishing the link, the CO modem then evaluates the performance of the link by evaluating several parameters, including for example, signal to noise ratio (SNR), automatic gain control (AGC) levels, bit error rates, and input power (step 510).

One way to evaluate performance is to measure the SNR that the modem yields. The higher the SNR the better the performance. The first element of SNR is the received signal. From the perspective of the CO modem 102, the received signal is transmitted by the CPE modem 106 and it suffers some loses in the UTP cable. The received signal is therefore calculated as the output power of the CPE modem 102 minus the losses in the cable. This received signal is limited because the losses created by the cable cannot be reduced. Furthermore, the power of the CPE modem 106 is limited due to the many constraints imposed by standard bodies such as the FCC, ETSI etc.

The second element of SNR is the noise. Cross-talk is a major contributor to noise. In the example of FIG. 2, the CO modem 102 receives the desired signal as described above, as well as undesirable interference from the cross-talk, in this case FEXT. The undesired FEXT will be added to whatever noise already exists in the system. The resulting SNR is roughly the delta between the power of the desired signal and the aggregate power of the noise.

Once the communications link has been evaluated, the information generated can be compared to predetermined thresholds by the CO modem 102 to determine the loop length and to identify any impairments on the link such as cross-talk or bridged taps (step 515). Various ways for identifying such impairments will be apparent to a person of ordinary skill in the relevant art(s) based on the descriptions provided herein.

Once the impairments have been identified, in step 520, the CO modem 102 determines what adjustments the CPE modem 106 should make to improve the performance of the communications link. In an embodiment, the CO modem 102 dictates a new carrier frequency for the upstream band. When signals are transmitted at high frequencies, the signals lose power. The higher the frequency, the greater the loss. Therefore, as the loop gets longer and longer (i.e., the distance between the CO modem and CPE modem), the adjusted upstream carrier frequencies will become lower and lower. By adjusting the upstream carrier frequencies, power loses can be avoided. In an embodiment, eventually, very long loops will end up staying at the default upstream carrier frequency or be moved to a lower frequency. The lowest frequency would be designed to favor the worst case (longest loop).

In another embodiment, the CO modem 102 dictates a new power level for the CPE modem 106. Here, power back off could be used as a way of improving the signal to noise ratio. Once the desired adjustment has been determined, the CO modem 102 communicates the adjustment to its CPE modem 106 counterpart.

Finally, in step 525, the two modems will establish an adjusted communications link. Where, for example, the desired adjustment is a new upstream carrier frequency, the CPE modem 106 will begin transmitting at the designated frequency.

In another embodiment of the present invention, in addition to the initial positioning of the upstream carrier frequency at the default position, the CO modem 102 can initiate a search for a preferred upstream carrier frequency.

Figure 6:
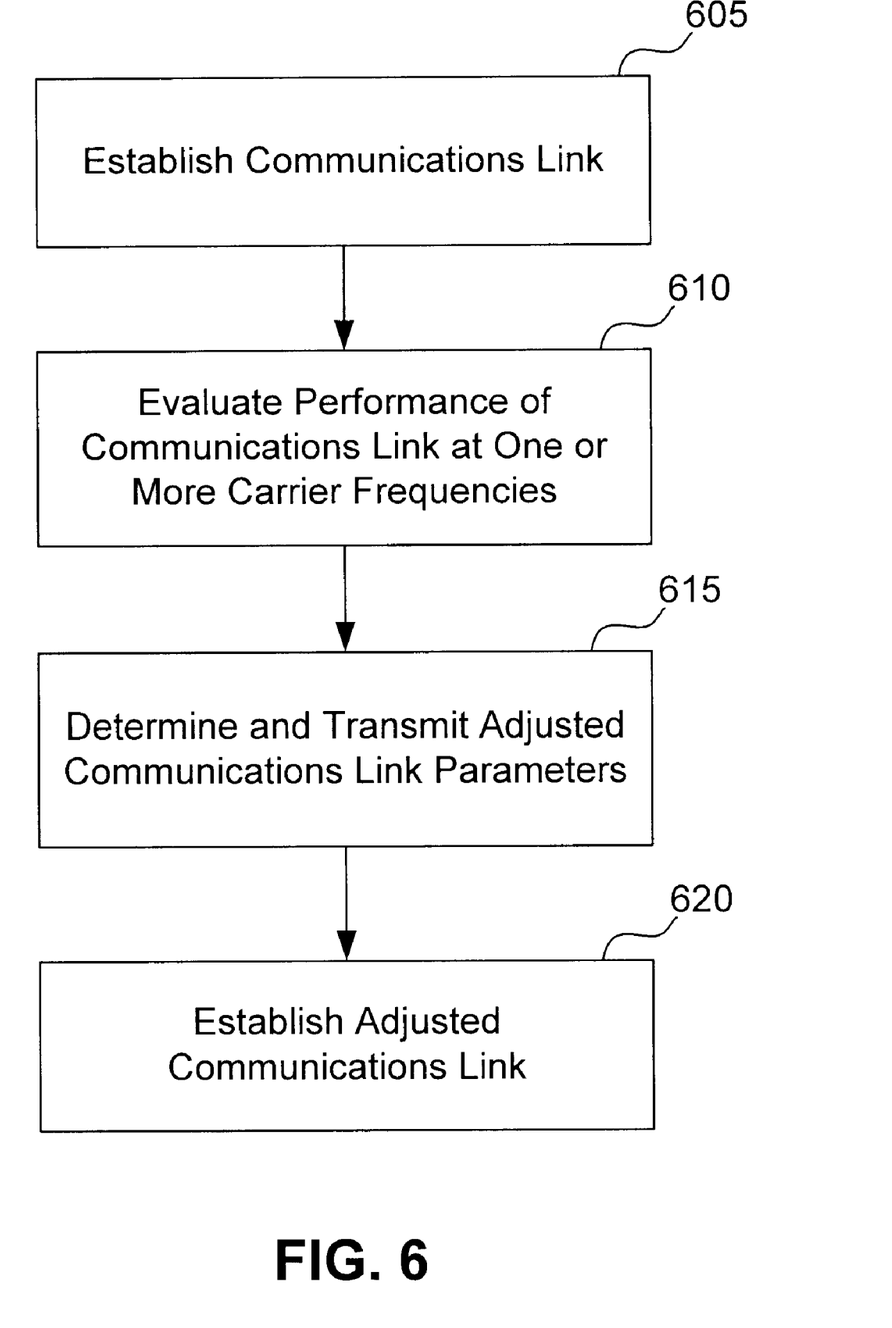
FIG. 6 is a flowchart of an alternative method for improving communications between high speed communications devices in accordance with embodiments of the present invention.

Referring to FIG. 6, in step 605, CO modem 102 transmits and creates a communications link with the CPE modem 106 during a handshaking initialization process. This first communications link is established with the upstream carrier frequency (CF) situated at a default position.

In step 610, CO modem 102 will evaluate the performance of the communications link at one or more carrier frequencies.

In step 615, the CO modem 102 determines and transmits an adjusted communications link parameter to the CPE modem 106. In embodiments of the present invention, the adjusted communications link parameter is the carrier frequency that produced the best communications link performance.

Finally, in step 620, the CPE modem 106 will adjust its transmission according to the received adjusted communications link parameter. In this way, for example, where the CO modem 102 cannot determine the reason for its SNR to be low, it can request that the CPE move the upstream carrier frequency up and down the band in search of the best SNR. This will enable the CO modem 102 to find the best possible location for the upstream band while considering the frequency and power transmitted by the CPE modem 106.

The present invention allows for the upstream band to be repositioned according to the needs of the modem suffering from the impairments, while at the same time, keeping cross-talk to a minimum. In accordance with embodiments of the present invention, when the CPE modem 106 succeeds in determining the loop length a better SNR will be produced at the CO modem 102 because cross-talk will have been moved out of the way. In addition, the present invention avoids bridged taps and interference from dissimilar modems whereas other attempts do not. While the present invention has been described in terms of adjustments made in the upstream carrier frequency, this is for example only and not limitation. Upon reading this disclosure, a person of ordinary skill in the art will recognize that the invention can also be applied to frequencies in the down stream ban as well.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for improving communications performance between high speed communications devices, comprising the steps of:
   (a) establishing a communications link between a central office (CO) modem and a customer premise equipment (CPE) modem, wherein said communications link uses a default upstream carrier frequency;
   (b) evaluating the performance of said communications link;
   (c) identifying one or more bridged taps on said communications link;
   (d) avoiding said identified one or more bridged taps by determining an adjusted upstream carrier frequency at which a bridged tap null does not exist; and
   (e) establishing an adjusted communications link between said CO modem and said CPE modem, wherein said adjusted communications link uses said adjusted upstream carrier frequency.

2. A method for improving communications performance between high speed communications devices, comprising the steps of:
   (a) establishing a communications link between a central office (CO) modem and a customer premise equipment (CPE) modem, wherein said communications link uses a default upstream carrier frequency;
   (b) evaluating the performance of said communications link;
   (c) identifying cross-talk on said communications link;
   (d) reducing said identified cross-talk by determining an adjusted upstream carrier frequency that is dissimilar from an upstream carrier frequency of an interfering modem; and
   (e) establishing an adjusted communications link between said CO modem and said CPE modem, wherein said adjusted communications link uses said adjusted upstream carrier frequency.

3. The method of claim 2 wherein said reducing step (d) further causes said CPE modem to adjust a power level.

4. A method for improving communications performance between high speed communications devices, comprising the steps of:
   (a) establishing a communications link between a central office (CO) modem and a customer premise equipment (CPE) modem;
   (b) evaluating the performance of said communications link at a plurality of upstream carrier frequencies;
   (c) determining an adjusted upstream carrier frequency according to said performance of said communications link at said plurality of upstream carrier frequencies; and
   (d) establishing an adjusted communications link between said CO modem and said CPE modem, wherein said adjusted communications link uses said adjusted upstream carrier frequency.

5. The method of claim 4, wherein said determining step (c) identifies an adjusted upstream carrier frequency that avoids bridged taps.

6. The method of claim 4, wherein said determining step (c) identifies an adjusted upstream carrier frequency that reduces cross-talk.

7. A system for improving communications performance between high speed communications devices, comprising:
   a central office (CO) modem; and
   a customer premise equipment (CPE) modem in communications with said CO modem over a communications link, wherein said CO modem and said CPE modem are configured to adjust an upstream carrier frequency to improve the performance of said communications link,
   wherein said CO modem causes said CPE modem to adjust said upstream carrier frequency to avoid cross-talk on said communications link, said adjusted upstream carrier frequency being dissimilar from an upstream carrier frequency of an interfering modem.

8. The system of claim 7, wherein said CO modem further causes said CPE modem to adjust said upstream carrier frequency to avoid bridged taps on said communications link.

* * * * *